US007966215B1

(12) United States Patent
Myers et al.

(10) Patent No.: US 7,966,215 B1
(45) Date of Patent: Jun. 21, 2011

(54) COMBINATION RESERVATION AND NAVIGATION SYSTEM AND METHOD

(75) Inventors: Theodore James Myers, East Dundee, IL (US); Patrick Jay Walsh, Bloomingdale, IL (US); Muna Nabilsi, Palatine, IL (US); Kevin D. Kaschke, Hoffman Estates, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 757 days.

(21) Appl. No.: 09/391,427

(22) Filed: Sep. 8, 1999

(51) Int. Cl.
*G07B 15/00* (2011.01)
(52) U.S. Cl. ......................................... 705/13
(58) Field of Classification Search ........................ 705/5
See application file for complete search history.

(56) References Cited

U.S. PATENT DOCUMENTS

| 5,293,163 | A | | 3/1994 | Kakihara et al. | |
|---|---|---|---|---|---|
| 5,432,508 | A | * | 7/1995 | Jackson | 340/932.2 |
| 5,648,906 | A | | 7/1997 | Amirpanahi | |
| 5,719,771 | A | | 2/1998 | Buck et al. | |
| 5,748,107 | A | | 5/1998 | Kersken et al. | |
| 5,794,207 | A | * | 8/1998 | Walker et al. | 705/1 |
| 5,831,552 | A | | 11/1998 | Sogawa et al. | |
| 5,877,704 | A | * | 3/1999 | Yoshida | 340/932.2 |
| 5,940,481 | A | * | 8/1999 | Zeitman | 705/13 |
| 5,948,040 | A | * | 9/1999 | DeLorme et al. | 701/201 |
| 6,085,976 | A | * | 7/2000 | Sehr | 235/384 |

FOREIGN PATENT DOCUMENTS

JP   401023399 A   *   1/1989

OTHER PUBLICATIONS

Anonymous, "DFW International Airport Adds New Level of Convenience With Nonstop, Automated Parking Payment System", Business Wire, May 4, 1999, 2 pages.*
Young, Renee, "Not your father's parking garage", Building Design & Construction, Jan. 1998, vol. 39, No. 1, pp. 58-62.*
Reverse auction article from http://en.wikipedia.org/wiki/Main_Page, 3 pages, accessed Mar. 11, 2006.*

* cited by examiner

*Primary Examiner* — R. D Rines
(74) *Attorney, Agent, or Firm* — Greenberg Traurig, LLP (57) ABSTRACT

A combination reservation and navigation system includes a reservation communication device and a customer communication device. The reservation communication device provides the reservation information to various customer communication devices associated with customers responsive to organizing the reservation information. The reservation communication device receives customer information, including a request for a reservation for the parking space, from the customer communication device. The reservation communication device transmits electronic navigation information to the customer communication device associated with the customer over a communication link responsive to the customer making the reservation. The electronic navigation information assists the customer in traveling from a customer geographic location to a business geographic location of the parking space reserved by the customer.

35 Claims, 5 Drawing Sheets

FIG. 1  100 COMBINATION RESERVATION AND NAVIGATION SYSTEM

COMBINATION RESERVATION AND NAVIGATION SYSTEM AND METHOD

FIELD OF THE INVENTION

The present invention relates generally to independent reservation systems and independent navigation systems, and more particularly to a combination reservation and navigation system and method therefor.

BACKGROUND OF THE INVENTION

Conventional reservation systems include, for example, ticket brokers, such as Ticketmaster™ or travel agencies, which offer tickets for sale to customers from various businesses. The various businesses represent various events, such as theater performances, musical concerts, sporting events, etc., or represent various transportation carriers for airplanes, trains, buses, boats, etc. Each ticket typically represents a reservation of a particular seat at a particular event or on a particular transportation carrier for a particular customer. A ticket broker usually receives blocks of tickets from each of the various businesses to sell to customers. The ticket broker organizes the blocks of tickets according to the price, type and date of the event or transportation carrier, etc. The ticket broker provides customers access to the tickets for sale via a telephone, an internet or a physical ticket booth, for example. The ticket broker receives a request to purchase a ticket for a particular event or transportation carrier from a customer. If the ticket for the particular event is available, ticket broker sells the customer the ticket. Sometimes the ticket broker provides the customer with confirmation information representing that the ticket has been purchased. The ticket broker updates a database of ticket information to reflect that the ticket has been sold to the customer. Sometime before the event, the ticket broker notifies the various businesses how many and which tickets of the blocks of tickets have been sold. The ticket broker typically receives payment for the ticket directly from the customer for forwarding to the various businesses. In this case, the ticket broker forwards the ticket to the customer either directly or via land mail with a receipt representing that the payment has been received. Typically, the ticket broker receives a commission from either the customer or the various businesses for the effort to broker tickets from the various businesses and the customers.

A problem with conventional reservation systems, such as ticket brokers, is that the customer may not know how to get to the place where the event or transportation carrier is located after the customer made the reservation. Most of the time, ticket brokers assume that the customer knows where the event or transportation carrier is located and does not provide any directions describing to the customer how to get to the event or transportation carrier. Sometimes ticket broker gives customers a geographic map on paper or brief and general written text directions on paper indicating the general location of the event or transportation carrier. However, the geographic map and written text directions typically do not include the customer's present geographic location and do not provide much comfort to customers that find map or text reading challenging, especially when driving alone. Generally, after the ticket broker sells the ticket, the ticket broker does not provide the customer with any assistance on how to get to the event or transportation carrier. Hence, customers, traveling to the event or transportation carrier to claim their reserved seat, are often left to find their own way by using a paper or an electronic map, or to ask directions to the event or transportation carrier from other people while traveling to the event or the transportation carrier.

Conventional navigation systems include, for example, telematic systems. Telematic systems generally include a locating device, such as a global positioning satellite (GPS) receiver, a memory unit for storing an electronic geographic map and a processor. Typically, a telematic system is carried with a mobile vehicle, such as a passenger car. The GPS receiver determines the location of the mobile vehicle on the surface of the earth. The processor correlates the determined location of the mobile vehicle on the surface of the earth relative to features on the electronic geographic map to assist a driver of the mobile vehicle with geographic navigation while driving.

A particular application of a telematic system involves assisting drivers of mobile vehicles with directions for locating parking facilities having available parking spaces. U.S. Pat. No. 5,748,107, issued May 5, 1998, entitled "Method And Apparatus For Locating An Available Parking Facility," U.S. Pat. No. 5,293,163, issued Mar. 8, 1994, entitled "Navigation Apparatus For Vehicles," U.S. Pat. No. 5,648,906, issued Jul. 15, 1997, entitled "Networked Computerized Parking System Of Networked Computerized Parking Meters And A Method Of Operating Said System," U.S. Pat. No. 5,831,552, issued Nov. 3, 1998, entitled "Traffic Information Display Unit," each disclose various methods and systems for locating parking facilities having available parking spaces. Generally, a method and a system sends information regarding parking space availability to a mobile vehicle responsive to a location of the mobile vehicle and a user's request. The mobile vehicle's location may be determined by a GPS system. A processor, carried by the mobile vehicle, correlates the determined location of the mobile vehicle on the surface of the earth relative to features on an electronic geographic map, carried by the mobile vehicle, to assist a driver of the mobile vehicle with geographic navigation to a parking facility while driving.

A problem with conventional navigation systems, such as telematic systems used to locate parking facilities, is that they do not accept reservations for a good or a service from a customer. For example, as in the telematic system used to locate a parking facility, a driver can locate various parking facilities based on the drivers input conditions, such as a price of the parking space, a geographic boundary of a parking facility acceptable to the driver and a time of arrival of the driver. However, after a driver determines a desirable parking facility having an available parking space and begins to drive to the parking facility with the help of a GPS receiver and an electronic geographic map, there is no guarantee that the parking space will still be available by the time the driver arrives at the parking facility. Most parking garages offer available parking spaces on a predetermined and prepaid reservation basis, such as monthly, or on a first come first serve basis. Therefore, while this type of telematic system helps the driver to find a desirable parking facility, this system may fail to help the driver achieve an ultimate goal of parking the mobile vehicle, if the parking spaces are taken by other mobile vehicles before the driver arrives at the parking facility.

In summary, conventional reservation systems operate independently of conventional navigation systems. Customers desiring to make reservations must communicate only with the conventional reservation system. Customers desiring navigation information must rely only on the conventional navigation system. Since these two systems operate independently, customers gain no advantage from synergy and optimization of a combination reservation and navigation system.

Accordingly, there is a need for a combination reservation and navigation system and method therefor to permit a customer to make a reservation for a good or a service offered by a business and located at a business geographic location, and to permit the customer to receive navigation information to assist the customer in traveling from a customer geographic location to the business geographic location.

DETAILED DESCRIPTION OF A PREFERRED EMBODIMENT

Figure 1:
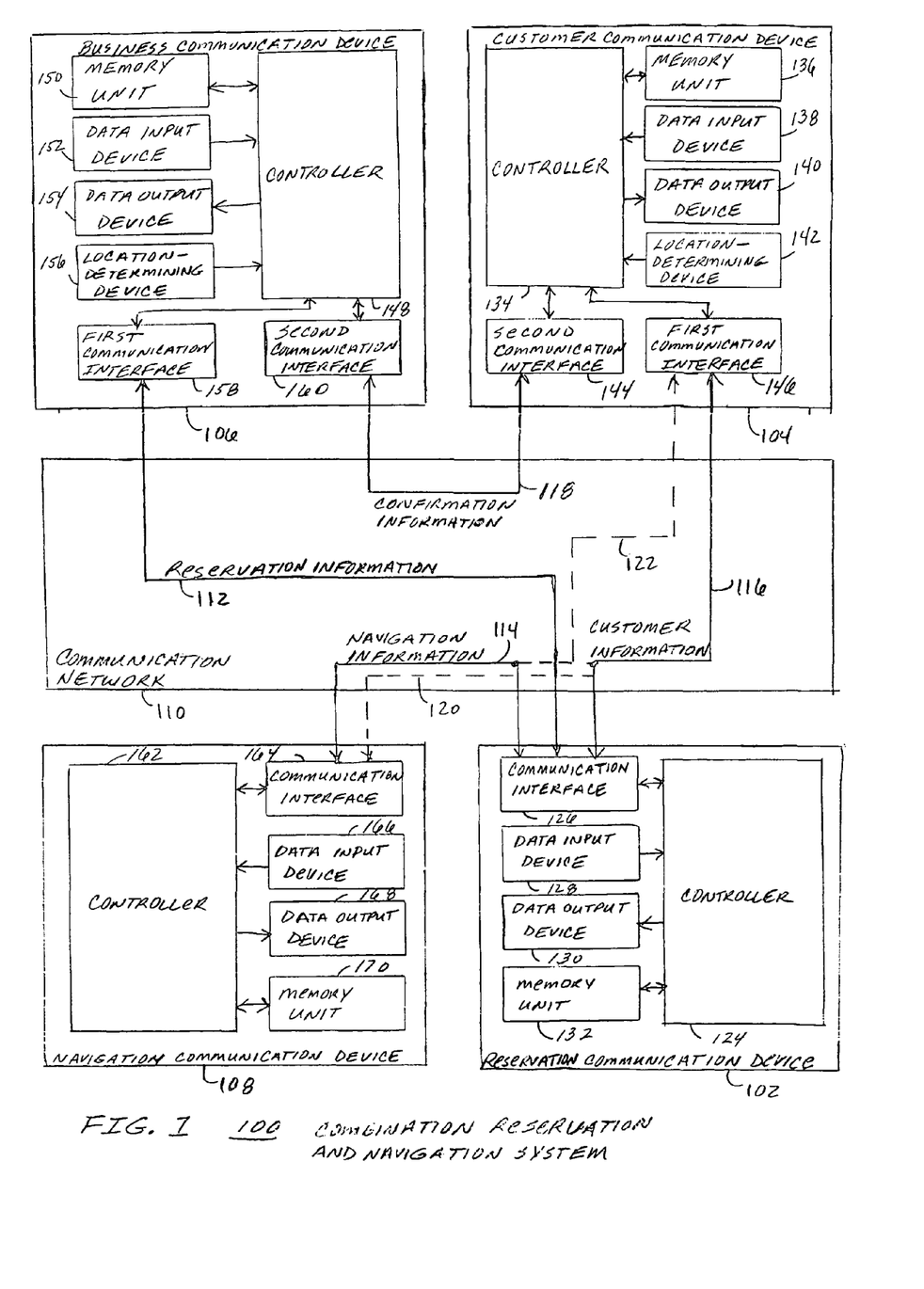
FIG. 1 illustrates a block diagram of a combination reservation and navigation system, including a reservation communication device, a customer communication device, a business communication device, a navigation communication device, and a communication network in accordance with a preferred embodiment of the present invention.

The following detailed description presents features and advantages gained by creating synergy between a reservation system and a navigation system to give customers optimal service and support. In a preferred embodiment of the present invention, a combination reservation and navigation system 100 advantageously permits customers to not only can make a reservation for a good or a service, but also permits the customers to receive electronic navigation information to assist the customer in traveling to the business location of the good or the service reserved.

FIG. 1 illustrates a block diagram of a combination reservation and navigation system 100. The combination reservation and navigation system 100 generally includes a reservation communication device 102, a customer communication device 104, a business communication device 106, a navigation communication device 108, and a communication network 110 in accordance with a preferred embodiment of the present invention. The reservation communication device generally includes a controller 124, a communication interface 126, a data input device 128, a data output device 130, and a memory unit 132. The customer communication device 104 generally includes a controller 134, a first communication interface 146, a second communication interface 148, a data input device 138, a data output device 140, a location determining device 142, and a memory unit 136. The business communication device 104 generally includes a controller 148, a first communication interface 158, a second communication interface 160, a data input device 152, a data output device 154, a location determining device 156, and a memory unit 150. The navigation communication device 104 generally includes a controller 162, a communication interface 164, a data input device 166, a data output device 168, and a memory unit 170.

Preferably, the reservation communication device 102, the customer communication device 104, the business communication device 106 and the navigation communication device 108 are computer devices operated by operated by a reservation service company, an individual customer, a business and a navigation service company. Examples of the reservation communication device 102 and the navigation communication device 108 include computer systems. Examples of the customer communication device 104 or the business communication device 106 generally includes both wireless and wired communication devices including, without limitation, a portable or vehicle mounted cellular or personal communication system (PCS) telephone, a two-way radio, a two-way pager, a personal digital assistant, a laptop computer, a vehicle navigation system, a desktop computer, a landline telephone and a cable television set having two way communication. Examples of business having the business communication device 106 generally include both those businesses represented by a reservation broker or agency and those that are not. Businesses typically represented by ticket brokers or agencies include, for example, musical concert businesses, sporting event businesses, live theater, voice or dance businesses, transportation carrier businesses for transportation, such as airplanes, trains, boats and buses, and hotel businesses. Businesses not typically represented by ticket brokers or agencies include, for example, parking facility businesses, such as enclosed parking garages or exposed parking lots or parking spaces along a street, and restaurant businesses. In the preferred embodiment of the present invention, the reservation communication device 102, the business communication device 106 and the navigation communication device 108 are computer systems, the customer communication device 104 is a cellular telephone and the business having the business communication device 106 is a parking garage facility having parking spaces. Alternatively, the customer communication device 104 is a wired communication device, such as a desktop computer, a landline telephone or a cable television set having a relatively fixed, non-mobile location, for the initial communication with the reservation communication device 102 to make a reservation, and is a wireless communication device, such as a portable or vehicle mounted cellular PCS telephone, a two-way radio, a two-way pager, a personal digital assistant, a laptop computer or a vehicle navigation system, for a continuing or final communication with the reservation communication device 102 to receive electronic navigation information.

The communication network 110 generally includes communication links 112, 114, 116, 118, 120 and 122 for communicating reservation information, customer information, electronic navigation information, and confirmation information among the four communication devices 102, 104, 106 and 108. On link 112, the reservation information is communicated between the reservation communication device 102 and the business communication device 106. On link 116, the customer information is communicated between the reservation communication device 102 and the customer communication device 104. Alternatively, on link 120, the customer information is communicated between the navigation communication device 108 and the customer communication device 104. On link 114, the electronic navigation information is communicated between the navigation communication device 108 and the reservation communication device 102. Alternatively, on link 122, the customer information is communicated between the navigation communication device 108 and the customer communication device 104. On link 118, the confirmation information is communicated between the customer communication device 104 and the business communication device 106.

In the preferred embodiment of the present invention, the communication network 110 is a telephone network. In the telephone network, links 112, 114 represent wireline communication links for carrying wireline telephone signals and links 116, 118, 120 and 122 represent radio frequency channels for carrying radio frequency signals. In this case, the reservation communication device 102, the business communication device 106 and the navigation communication device 108 are fixed communication devices and the customer communication device is a mobile communication device. Preferably, the radio frequency channels 116, 120 and 122 communicate packet data signals, such as cellular digital packet data (CDPD) signals or code division multiple access (CDMA) packet data signals. Packet data signals advantageously provide efficient communications to permit the reservation communication device 102 to push information to the customer communication device when the customer does not specifically request the information. Alternatively, any other signaling standard may be used.

Preferably, radio frequency channel 118 communicates the confirmation information, as radio frequency signals, between the customer communication device 104 and the business communication device 106 responsive to the customer communication device 104 being at a location proximate to the business communication device 106 (e.g. less than 100 meters). The radio frequency channel 118 preferably operates in an unlicensed radio frequency bandwidth at 2.4 GHz according to a Bluetooth signaling standard, as is presently being developed in the art. Alternatively, the link 118 may represent a printed card, having the confirmation number and read by a card reader device, a keypad accepting the confirmation manually entered by the customer, or an infra red frequency signal generated by the customer communication device 104.

Alternatively, links 112, 114, 116, 118, 120 and 122 may comprise any combination of wireline communication links, coaxial cable communication links and radio frequency communication links. Typically, the type of link is dependent on the type of device communicating over the link. For example, if the business communication device 106 were located at a remote business location where no wireline telephone service is available, then the link 112 would preferably be a radio frequency communication link. Further, by example, if the customer communication device 104 were a fixed communication device such as desktop personal computer, then the link 116 or 112 would preferably be a wireline telephone link or a coaxial cable communication link.

For each of the links 112, 114, 116, 118, 120 and 122 the format of the signaling between the four devices 102, 104, 106 and 108 generally includes a source address, a destination address and a data field. The source address is the address of the device transmitting the signal. The destination address is the address of the device for which the signal is intended. The data field contains the transmitted information, represented here as the reservation information, the electronic navigation information, the customer information, and the confirmation information. The source and destination addresses may be telephone numbers or interne protocol addresses.

The reservation information is generally any information needed by a customer to reserve a good or a service from a business. Such reservation information includes, without limitation, availability, location, price, type and owner of the good or the service. The good or the service is dependent on the type of business providing the good or the service. The good or the service typically represents something whose availability is transient over a relatively short period of time. Examples of the good or the service, corresponding to the businesses mentioned herein, include, without limitation, musical concert seats, sporting event seats, live theater, voice or dance seats, transportation carrier seats for transportation, such as airplanes, trains, boats and buses, parking spaces, restaurant seats and hotel rooms. In the preferred embodiment of the present invention, the reservation information is related to reservations for parking spaces. The reservation information may be provided by the business to the reservation communication system either automatically, using a computer system, or manually, by a businessperson, depending on the size or sophistication of the parking garage.

The customer information is generally any information needed for a customer to make a reservation for a customer. The customer information generally includes the reservation information, the electronic navigation information and the confirmation information. Such customer information includes, without limitation, a name, an address, and a payment method of a customer, a reservation request including specific or general limits for a date, a time, a price, a geographic location, and frequency of use for the good or the service, and a confirmation number and electronic navigation information for the reservation. The customer information may also include a customer profile representing preferences of the customer for the good or the service desired by the customer. The customer profile may be stored with the reservation communication device 102 for future reference in assisting the customer according to the customer's preferences. The customer may request a single reservation at one time or multiple reservations at the same time or different times.

The electronic navigation information is generally any information needed to assist a customer in traveling from a customer geographic location to a business geographic location of the good or the service reserved by the customer. The customer geographic location is a location of the customer communication device 104 associated with the customer. The customer geographic location may be inputted by the customer or may be determined automatically by a location-determining device, such as a global positioning satellite (GPS) receiver. The business geographic location is a location of the business communication device 106 associated with a business. The business geographic location may be inputted by a business person, listed in a database stored in the memory unit 150 of the business communication device 106 or may be determined automatically by a location determining device, such as a GPS receiver. The electronic navigation information may include longitude, latitude, a street address, a street intersection, a zip code, directions, etc. The electronic navigation information may include information on a more micro level, such as, for example, where a particular seat is located in a stadium or in a theater, or where a curbside drop off point is for an airline outside an airport. The electronic navigation information may take the form of an electronic map with a path of travel highlighted thereon, or may take the form of directions given provided as electronic text. The path or directions may take into account a preference for the shortest route, the quickest route and traffic or construction considerations. In the preferred embodiment of the present invention, the electronic navigation information is electronic information having a format suitable for receipt by a customer communication device 102. For example, the electronic information is preferably an electronic map with a path of travel highlighted, wherein the size of the electronic map is only large enough for the path to be followed, because the customer communication device 104 typically does not have the memory capacity to store such a large electronic map. Therefore, the customer communication device 104, implemented as a portable cellular telephone, does not have to store such a large electronic map of all desirable geographic areas. Alternatively, in the case of a vehicle based navigation system, large electronic maps are typically included on an addressable CD-ROM. In this case, the electronic navigation information represents the location of the business having the good or the service reserved by the customer. An advantage of the customer receiving the navigation information electronically is that the customer no longer needs to manually record addresses, directions, names of businesses, etc. using a paper and pencil and then read a paper map to travel to the business location having the good or the service associated with the reservation. With the navigation information provided electronically, the need for a paper and pencil is eliminated. Further, the electronic information may be used with other complimentary customer navigation electronic equipment, such as a GPS receiver and/or a CDROM electronic map, to provide the customer with enhanced navigation capabilities.

The confirmation information is generally any information needed for a customer to assure the reservation with the business. In the preferred embodiment of the present invention, the confirmation information is a number associated with an electronic file having all of the details related to the reservation. The reservation communication device 102 and the business communication device 106 preferably retain the confirmation information, until the reservation has expired. At any time before the expiration of the reservation, the customer may have the navigation and/or reservation sent again to the customer communication device.

The combination reservation and navigation system may have any one of multiple fee structures associated therewith for revenue generation. Examples of fee structures include, without limitation, a monthly customer fee, a per use customer fee, a business listing fee and an advertising listing fee. Preferably, the multiple fee structures are available on the system in various combinations to effect various business plans, such as ease of deployment, optimum price point for the businesses and the customers, etc. Depending on the fee structure, the customer information may be pulled from the reservation communication device 102 by the customer communication device 104 or pushed by the reservation communication device 102 to the customer communication device 104. The reservation communication device 102 correlates the available goods and services from the businesses, the advertisements for the goods and services, the customer profile, etc. to push selected information to the customer communication device 104. Customers may gain credits representing a fee reduction or bonus goods or services from the businesses based on the customer's frequency of use of the system 100.

The combination reservation and navigation system 100 is preferably implemented in accordance with one of two business models. The first business model is the preferred embodiment of the present invention. In the first business model, the businesses are those types of businesses, which are not conventionally associated with a ticket broker or agency. These types of businesses are typically relatively smaller businesses, such as parking facilities, restaurants and hotels. Further, the availability of the goods or services offered by these types of businesses is relatively transient, as typically measured in minutes, hours or several days, for example. These types of business are presently underrepresented by conventional ticket brokers or agencies. In the first business model, the business communication device 104 represents a computer server having a database stored therein for tracking the goods or services, such as parking spaces, available at various parking facilities. The reservation communication device 102 is a computer server having a database stored therein for receiving, organizing and providing the reservation information to potential customers, and taking and making the reservations, taking payments, etc. from actual customers. Therefore, the reservation communication device 102 acts as a ticket broker or ticket agency for these types of businesses. The reservation communication device 102 may be a computer server operated by a telephone company, such as Ameritech, Inc., or the like or it may be operated by separate company that does not provide telephone service to subscribers. Preferably, the navigation communication device 108 is a separate business entity that works in cooperation with the reservation communication device 102 in a way that is nearly transparent to the customer. The navigation communication device 108 is a business entity that is already in the business of providing navigation information, such as AAA Auto Company or internet based electronic map services. Alternatively, the navigation communication device 108 may be integrated with the reservation communication device 102. In practice, a customer makes a reservation with the reservation communication device 102. Then the reservation communication device 102 forwards the electronic navigation information from the navigation communication device 108 or puts the customer in direct contact with the navigation communication device 108. With this first business model, the customer now not only reserves typically underrepresented goods and services, but also receives electronic navigation information on how to get to the business geographic location of the reserved goods and services. In the particular case of the business of parking facilities, the customer advantageously makes a reservation for a particular available parking space and then follows the electronic navigation information to reach the location of the available parking space.

In the second business model, the businesses are those types of businesses, which are conventionally associated with a ticket broker or agency. These types of businesses are typically relatively larger businesses, such as sporting events, musical concerts, and transportation carriers, as mentioned hereinabove. Further, the availability of the goods or services offered by these types of businesses is relatively stable, as typically measured in days, weeks or years, for example. These types of business are presently well represented by conventional ticket brokers or agencies. In the second business model, the business communication device 104 represents a computer server having a database stored therein for tracking the goods or services, such as music concert tickets, available at various concert stadiums. The reservation communication device 102 is a computer server having a database stored therein for receiving, organizing and providing the reservation information to potential customers, and taking and making the reservations, taking payments, etc. from actual customers. Therefore, the reservation communication device 102 represents the computer server associated with a ticket broker or ticket agency. The reservation communication device 102 may be a computer server independently operated from a telephone company, such as Ameritech, Inc. Preferably, the navigation communication device 108 is a separate business entity that works in cooperation with the reservation communication device 102 in a way that is nearly transparent to the customer. The navigation communication device 108 is a business entity that is already in the business of providing navigation information, such as AAA Auto Company or interne based electronic map services. Alternatively, the navigation communication device 108 may be integrated with the reservation communication device 102. In practice, a customer makes a reservation with the reservation communication device 102. Then the reservation communication device 102 forwards the electronic navigation information from the navigation communication device 108 or puts the customer in direct contact with the navigation communication device 108. With this second business model, the customer now not only reserves typically well represented goods and services, but also receives electronic navigation information on how to get to the business geographic location of the reserved goods and services. In the particular case of the business of music concert tickets, the customer advantageously makes a reservation for a particular available music concert ticket and then uses the electronic navigation information to reach the location of the music concert stadium where the music concert will be held.

Regardless of which business model is implemented, the combination reservation and navigation system 100 is most advantageous when the communication network 110 covers a wide geographic area having many customers and businesses. In this case, the many customers may communicate over the communication network 110 with the reservation service(s) to make reservations for the many businesses goods or services and to receive electronic navigation information from the navigation service(s). Therefore, the most customers and business are connected and served.

Inside the reservation communication device 102, the controller 124 is coupled to each of the communication interface 126, the data input device 128, the data output device 130 and the memory unit 132. The reservation information, the customer information and the electronic navigation information are communicated between the communication interface 126 and the controller 124. The memory unit 132 stores the reservation information, the customer information and the electronic navigation information received via the communication interface 126. The controller 124 performs the steps in the flowchart 200, as illustrated and described with reference to FIG. 2. The data input device 128 generates data input signals responsive to actions of a reservation operator to program the controller 124 to perform the steps in the flowchart 200. The data output device 130 and generates data output signals representative of at least one of the reservation information, the customer information, the electronic navigation information, the customer geographic location and the business geographic location.

Inside the customer communication device 104, the controller 134 is coupled to each of the memory unit 136, the data input device 138, the data output device 140, the location determining device 142, the second communication device 144 and the first communication interface 146. The customer information is communicated between the customer communication device 104 and the reservation communication device 102 via the first communication interface 146. The memory unit 136 stores the customer information received via the first communication interface 146. The controller 134 performs the steps of the flowchart 300, as illustrated and described with reference to FIG. 3. The data input device 138 generates data input signals responsive to actions of the customer to cause the controller 134 to perform the steps of the flowchart 300. The data output device 140 generates data output signals representative of at least one of the reservation information, the confirmation information, and the electronic navigation information. The location-determining device 142 determines the customer geographic location associated with the customer communication device 104.

Inside the business communication device 106, the controller 148 is coupled to each of the memory unit 150, the data input device 152, the data output device 154, the location determining device 156, the second communication interface 160 and the first communication interface 158. The first communication interface 158 communicates the reservation information and the location information between the business communication device 106 and the reservation communication device 102. The memory unit 150 stores the reservation information, the confirmation information and the location information. The controller 148 performs the steps in the flowchart 400, as illustrated and described with reference to FIG. 4. The data input device 152 generates data input signals responsive to actions of a businessperson to cause the controller 148 to perform the steps in the flowchart 400. The data output device 154 generates data output signals representative of the reservation information, the confirmation information and the location information. The second communication interface 158 receives the confirmation information from the customer communication device 104, associated with the customer, responsive to the customer communication device 104 being proximate to the business communication device 106 at the business geographic location.

When the business communication device 104 is implemented for a parking facility, the controller 148 preferably automatically collects data at the parking facility to determine the number of available parking spaces. The data input device 152 effects automatic data collection, for example, by subtracting the outgoing gate counts from the incoming gate counts and inputting them into the controller 148 for comparison against a predetermined parking space count.

Inside the navigation communication device 108, the controller 162 is coupled to each of the communication interface 164, the data input device 166, the data output device 168 and the memory unit 170. The communication interface 164 communicates the electronic navigation information between the navigation communication device 108 and the reservation communication device 102 or the customer communication device 104. The memory unit 170 stores the electronic navigation information and the confirmation information. The controller 162 performs the steps in the flowchart 500, as illustrated and described with reference to FIG. 5. The data input device 166 generates data input signals responsive to actions of a businessperson to cause the controller 166 to perform the steps in the flowchart 500. The data output device 168 generates data output signals representative of the electronic navigation information and the confirmation information.

In each of the reservation communication device 102, the customer communication device 104, the business communication device 106 and the navigation communication device 108, the communication interfaces 126, 144/146, 158/160 and 164, respectively, comprises one of a wireline communication interface, a coaxial cable communication interface and a radio frequency communication interface for communicating electronic signals over the communication links 112, 114, 116, 118, 120 and 122, as described with reference to the communication links hereinabove.

In each of the customer communication device 104 and the business communication device 106, the second communication interfaces 144 and 160, respectively, are radio frequency communication interfaces adapted to transmit the confirmation information over a radio frequency communication channel responsive to the customer communication device 104 being proximate to the business communication device 106, as described in detail hereinabove.

In each of the customer communication device 104 and the business communication device 106, the location determining devices 142 and 156, respectively, are preferably implemented as GPS receivers. Alternatively, the location determining devices 142 and 156 may be one of the network solutions (e.g., amplitude, phase, or time based) for locating a cellular telephone presently being proposed for the emergency 911 cellular system.

In each of the reservation communication device 102, the customer communication device 104, the business communication device 106 and the navigation communication device 108, the data input devices 128, 140, 152, and 166, respectively, may be a data keypad, a touchscreen or voice activated system.

In each of the reservation communication device 102, the customer communication device 104, the business communication device 106 and the navigation communication device 108, the data output devices 130, 140, 154 and 168, respectively, may be a visual display or an audible output.

In each of the reservation communication device 102, the customer communication device 104, the business communication device 106 and the navigation communication device 108, the memory units 132, 136, 150, and 170, respectively, contain databases that store and organize the appropriate information. The memory units 132, 136, 150, and 170 are preferably internal to the appropriate devices 102, 104, 106 and 108, respectively, but may also be external to the appropriate devices and then coupled thereto.

Figure 2:
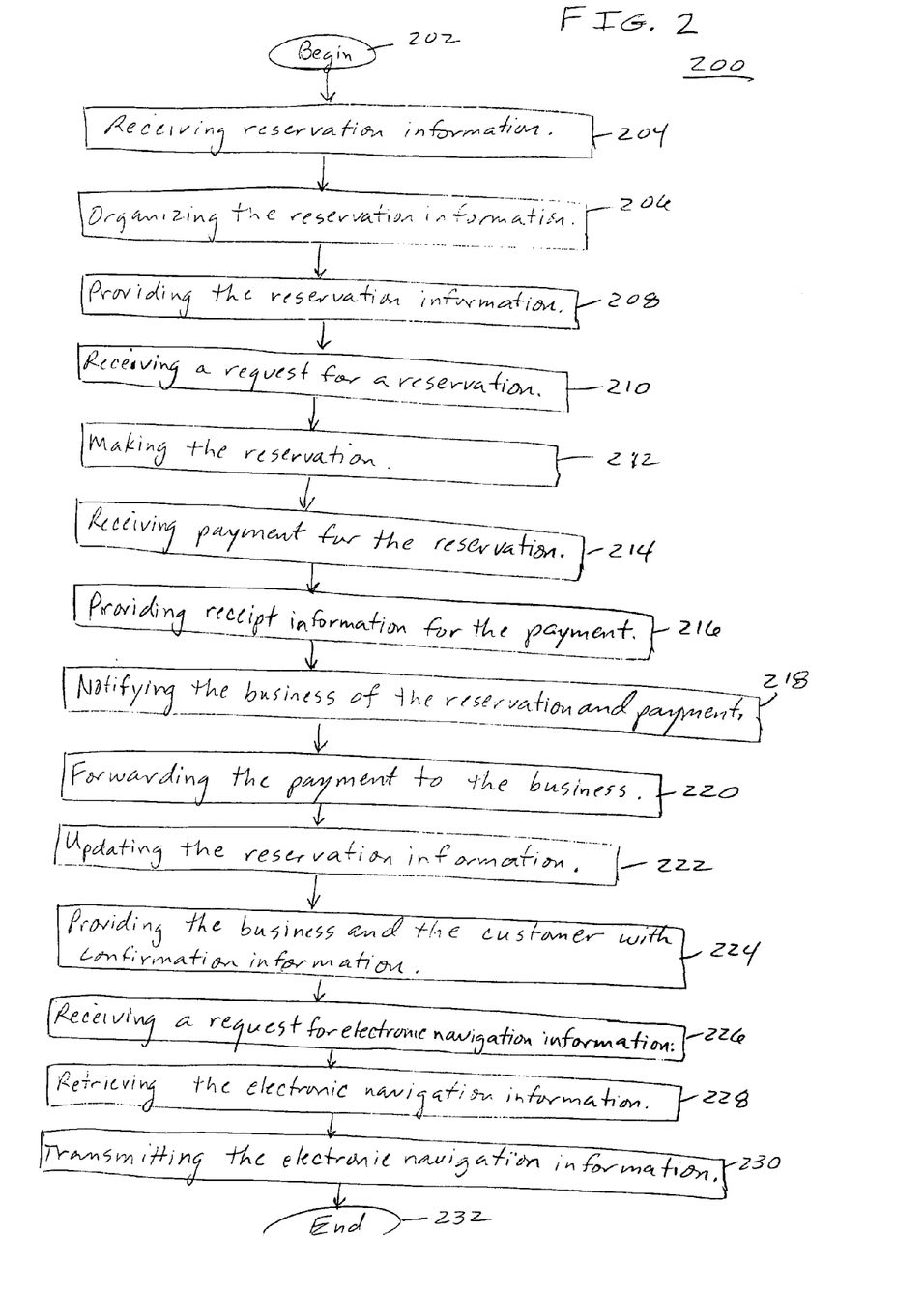
FIG. 2 illustrates a flowchart describing a method performed by the reservation communication device illustrated in FIG. 1 in accordance with a preferred embodiment of the present invention.

FIG. 2 illustrates a flowchart 200 describing a method performed by the reservation communication device 102 illustrated in FIG. 1 in accordance with a preferred embodiment of the present invention.

At step 202, the method begins.

At step 204, the reservation communication device 102 receives reservation information from each of a plurality of businesses having a good or a service that may be reserved by customers. Preferably, the reservation information is received from the business communication devices 106 automatically via computer servers in the two devices 102 and 106 communicating with each other when desirable to do so.

At step 206, the reservation communication device 102 organizes the reservation information according to predetermined considerations responsive to the step 204 of receiving the reservation information. The predetermined considerations include, for example, the type of business, price of the good or the service, the location of the good or the service, etc.

At step 208, the reservation communication device 102 provides the reservation information to the customers responsive to the step 206 of organizing the reservation information. The reservation information may be provided responsive to the customer calling a phone number, accessing a web page, operating a kiosk, physically visiting a ticket booth, etc. The good or the service may be auctioned to the customers responsive to negotiations between the reservation communication device 102 and the customers for the good or the service. The auction would include offers and counter offers between both parties in an attempt to reach an agreement. The auction would also permit the various businesses to be more aggressive with their business depending on various business factors, such as the time of the day, week and year, volume of activity and any given time, special promotions, etc.

At step 210, the reservation communication device 102 receives the customer information, including a request for a reservation for the good or the service, from a customer responsive to the step 208 of providing the reservation information. The customer information may include a customer profile representing preferences of the customer for the good or the service desired by the customer.

At step 212, the reservation communication device 102 makes the reservation for the good or the service associated with one of the plurality of businesses for the customer responsive to the step 210 of receiving the request for the reservation.

At step 214, the reservation communication device 102 receives a payment from the customer for the good or the service associated with the reservation responsive to the step 212 of making the reservation. The payment may be in an electronic form of electronic cash or a credit card, for example, or may be in hard form, such as a check or cash.

At step 216, the reservation communication device 102 provides the customer with receipt information representing that the payment has been received responsive to the step 214 of receiving the payment. The receipt may be mailed electronically or by land to the customer.

At step 218, the reservation communication device 102 notifies the one of the plurality of businesses that the reservation has been made and paid for by the customer responsive to the step 216 of receiving the payment.

At step 220, the reservation communication device 102 forwards the payment for the reservation to the one of the plurality of businesses responsive to the step 218 of receiving the payment. The payment may be mailed electronically or by land to the customer.

At step 222, the reservation communication device 102 updates the reservation information stored in the memory unit 132 responsive to the step 220 of making the reservation.

At step 224, the reservation communication device 102 provides at least one of the customer and the one of the plurality of businesses with the confirmation information representing that the reservation has been made responsive to the step 222 of making the reservation.

At step 226, the reservation communication device 102 receives a request for the electronic navigation information from the customer responsive to the step 212 of making the reservation.

At step 228, the reservation communication device 102 retrieves the electronic navigation information from the navigation communication device 108.

At step 230, the reservation communication device 102 transmits the electronic navigation information to the customer over a communication link responsive to the step 212 of making the reservation.

At step 232, the method ends.

Figure 3:
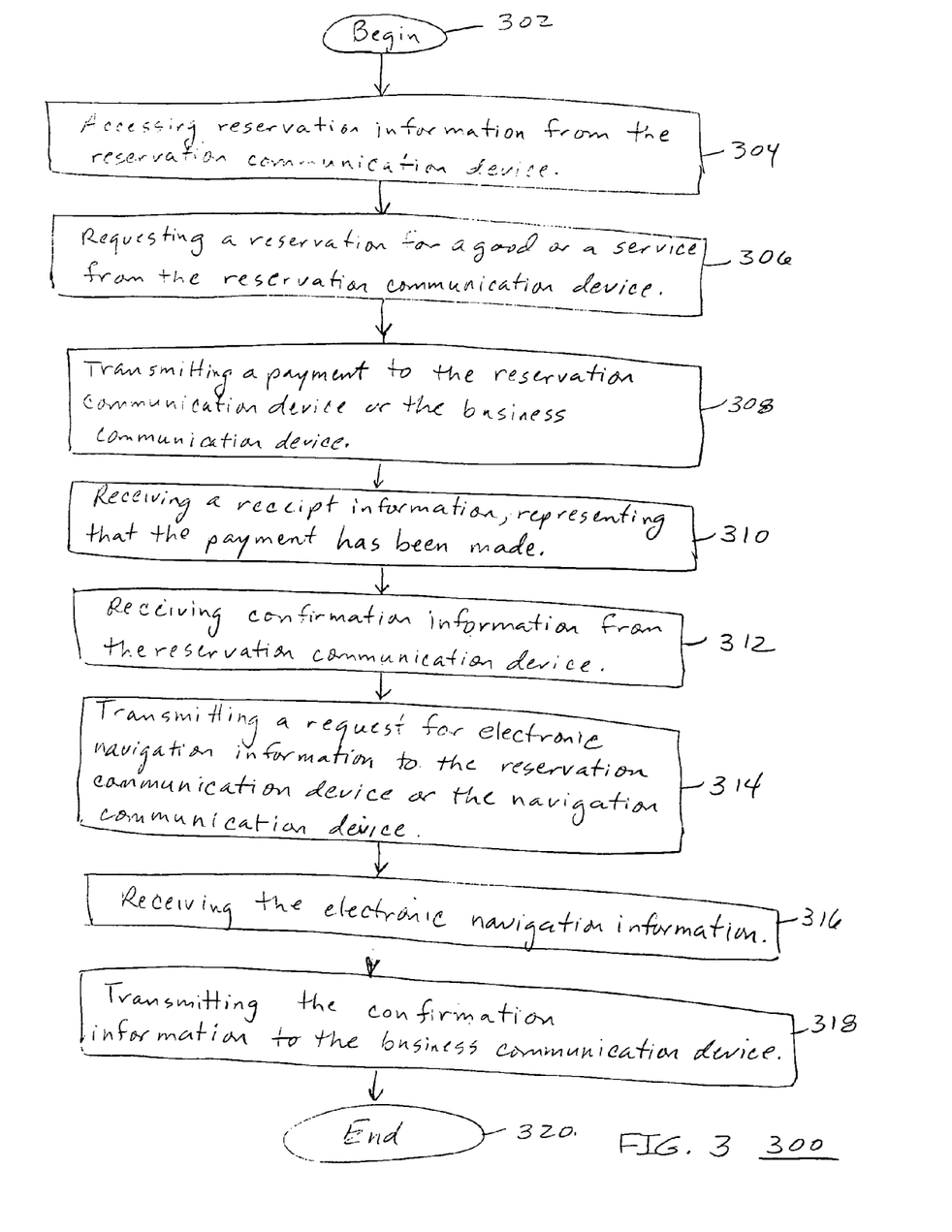
FIG. 3 illustrates a flowchart describing a method performed by the customer communication device illustrated in FIG. 1 in accordance with a preferred embodiment of the present invention.

FIG. 3 illustrates a flowchart 300 describing a method performed by the customer communication device 104 illustrated in FIG. 1 in accordance with a preferred embodiment of the present invention.

At step 302, the method begins.

At step 304, the customer communication device 104 accesses reservation information representing the good or the service that may be reserved by customers from one of a plurality of businesses. The customer communication device 104 may access the reservation information via a telephone call or by visiting a web site on the internet, for example. At step 304, the customer communication device 104 may negotiate with the reservation communication device for the good or the service desired by the customer responsive to the reservation communication device auctioning the good or the service to the customer.

At step 306, the customer communication device 104 makes a request for a reservation of the good or the service responsive to the step 304 of accessing the reservation information. The request includes all information necessary for making a reservation and may include customer profile information. The customer may make multiple reservations at the same time including, for example, dinner and theater reservations.

At step 308, the customer communication device 104 transmits a payment to one of the reservation communication device 102 and the business communication device 106 for the good or the service associated with the reservation responsive to the step 306 of making the request for the reservation.

At step 310, the customer communication device 104 receives receipt information representing that the payment has been received by the one of the reservation communication device 102 and the business communication device 106 responsive to the step of transmitting the payment.

At step 312, the customer communication device 104 receives confirmation information, representing that the reservation has been made for the good or the service associated with one of the plurality of businesses, responsive to the step 306 of making the request.

At step 314, the customer communication device 104 transmits a request for the electronic navigation information responsive to the step 312 of receiving the confirmation information. The customer communication device 104 may be programmed to automatically query the reservation communication device 102 or the navigation communication device 108 for any electronic navigation information when the customer communication device is turned on.

At step 316, the customer communication device 104 receives the electronic navigation information from the reservation communication device 102 over a communication link responsive to the step 312 of receiving the confirmation information. If multiple reservations were made, then multiple corresponding sets of electronic navigation information are received to assist the customer in traveling to and from the various business geographic locations associated with the multiple reservations. The electronic navigation information may be pushed to the customer communication device 104, without any prompting or query, by either the reservation communication device 102 or the navigation communication device 108. In this case, whenever the customer communication device 104 is turned on, the electronic navigation information is automatically received.

At step 318, the customer communication device 104 transmits the confirmation information to the one of the plurality of businesses located at the business geographic location responsive to the customer arriving at the business geographic location. Preferably, the confirmation information is communicated over a radio frequency communication channel responsive to the customer communication device being proximate to the business communication device, as described hereinabove.

Preferably, a mobile, wireless customer communication device 104, such as a cellular telephone performs steps 304, 306 and 312. This scenario permits a customer to use the cellular telephone to make the reservation at the last minute while away from the home or the office and then to retrieve the electronic navigation information while traveling to the business geographic location where the good or the service is reserved by the customer. Alternatively, a fixed, wired customer communication device 102, such as a desktop personal computer may perform steps 304, 306 and 312, and a mobile, wireless customer communication device 104, such as a cellular telephone may perform the step 316. This scenario permits a customer to make the reservation in advance while at the home or the office and then to retrieve the electronic navigation information using the cellular telephone when needed while traveling to the business geographic location where the good or the service is reserved by the customer. The mobile, wireless customer communication device 104 may access the electronic navigation information by automatic or manual of dialing a telephone number or accessing a web site and then entering the confirmation number.

At step 320, the method ends.

Figure 4:
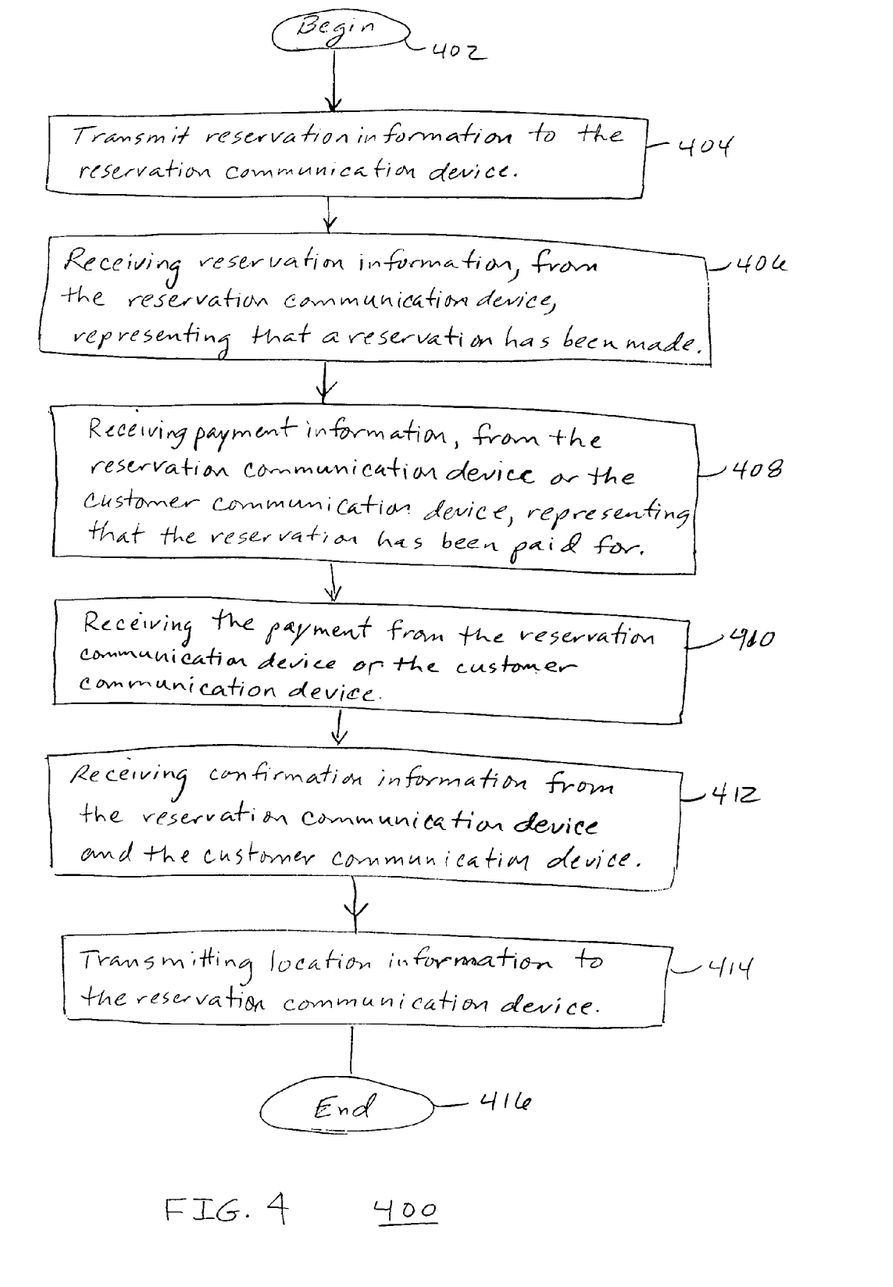
FIG. 4 illustrates a flowchart describing a method performed by the business communication device illustrated in FIG. 1 in accordance with a preferred embodiment of the present invention.

FIG. 4 illustrates a flowchart 400 describing a method performed by the business communication device 106 illustrated in FIG. 1 in accordance with a preferred embodiment of the present invention.

At step 402, the method begins.

At step 404, the business communication device 106 communicates reservation information between the business communication device 106 and the reservation communication device 102.

At step 406, the business communication device 106 receives the reservation information representing that the customer has made a reservation for the good or the service.

At step 408, the business communication device 106 receives a payment from one of the customer and the reservation communication device 102 for the good or the service associated with the reservation.

At step 410, the business communication device 106 provides the one of the customer and the reservation communication device 102 providing the payment with receipt information representing that the payment has been received responsive to the step 408 of receiving the payment.

At step 412, the business communication device 106 receives the confirmation information, representing that the reservation has been made, from at least one of the reservation communication device 102 and the customer.

At step 414, the business communication device 106 transmits location information to the reservation communication device 102 responsive to the step 404 of communicating the reservation information.

At step 416, the method ends.

Figure 5:
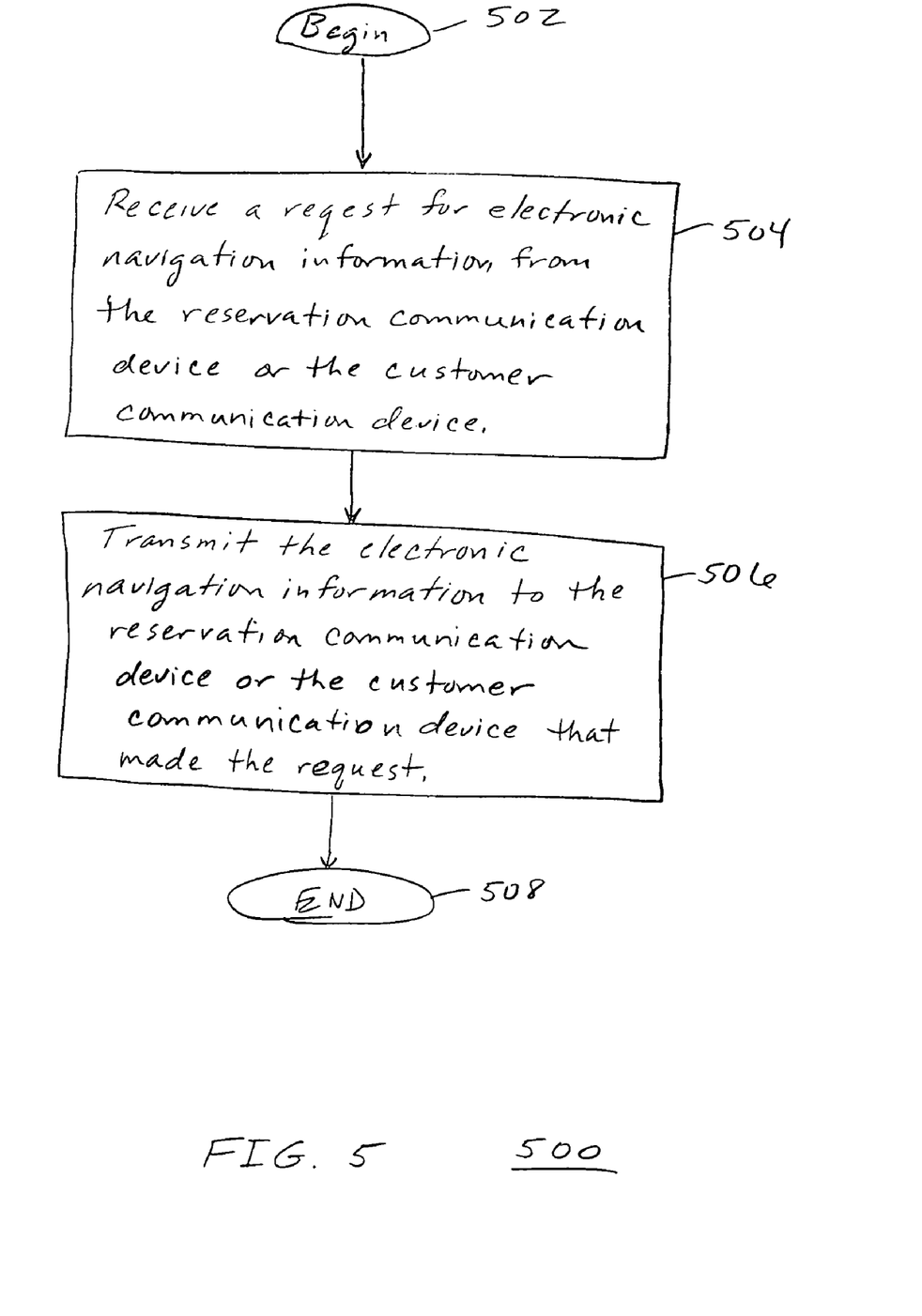
FIG. 5 illustrates a flowchart describing a method performed by the navigation communication device illustrated in FIG. 1 in accordance with a preferred embodiment of the present invention.

FIG. 5 illustrates a flowchart 500 describing a method performed by the navigation communication device 108 illustrated in FIG. 1 in accordance with a preferred embodiment of the present invention.

At step 502, the method begins.

At step 504, the navigation communication device 108 receives a request from either the reservation communication device 102 or the customer communication device 104 for the electronic navigation information. The request from the customer typically includes with the confirmation number, initially provided by the reservation communication device 102, which corresponds to the electronic navigation information desired by the customer. The request from the reservation communication device 102 typically includes the customer's geographic location and the business geographic location.

At step 506, the navigation communication device 108 transmits the electronic navigation information to the reservation communication device 102 or the customer communication device 104.

At step 508, the method ends.

In summary of the detailed description, the combination reservation and navigation system 100 advantageously provides customers with services not previously available. With the system 100, a customer not only can make a reservation for a good or a service, but also receive electronic navigation information to assist the customer in traveling to the business location of the good or the service reserved. The scope and implementation of the system 100 depends on the type of business model chosen. The system 100 may leverage exiting businesses and devices or may create new businesses and devices. The scope of the customer communication device 104 may range from presently available wireline and radio telephones and vehicle navigation systems to internet radio telephones, laptop computers with telephone modems and cable television systems with communication modems. However, whatever business model is chosen, whatever communication device is implemented for the reservation device, the customer device, the business device and the navigation system device, whatever communication link is used, whatever businesses are involved, and whatever the particular steps of the methods are implemented, the combination reservation and navigation system 100 operates most efficiently over a communication network 110 having access to many customers and businesses.

Hence, while the present invention has been described with reference to various illustrative embodiments thereof, the present invention is not intended that the invention be limited to these specific embodiments. Those skilled in the art will recognize that variations and modifications can be made without departing from the spirit and scope of the invention as set forth in the appended claims.

We claim:

1. A method, comprising:
   accessing reservation information representing a good or a service that may be reserved by customers from one of a plurality of businesses;
   making a request for a reservation of the good or the service responsive to the step of accessing the reservation information;
   receiving confirmation information, representing that the reservation has been made for the good or the service associated with one of the plurality of businesses, responsive to the step of making the request; and
   receiving electronic navigation information from a reservation communication device over a communication link responsive to the step of receiving the confirmation information, wherein the electronic navigation information comprises directions to assist a customer in traveling from a customer geographic location to a business geographic location of the good or the service reserved by the customer, wherein the customer geographic location is automatically determined for the customer by a location-determining device in response to receipt of the confirmation information.

2. A method according to claim 1 further comprising the steps of transmitting a payment to one of the reservation communication device and a business communication device for the good or the service associated with the reservation responsive to the step of making the request for the reservation; and
   receiving receipt information representing that the payment has been received by the one of the reservation communication device and the business communication device responsive to the step of transmitting the payment.

3. A method according to claim 1 further comprising the step of:
   transmitting a request for the electronic navigation information responsive to the step of receiving the confirmation information.

4. A method according to claim 1 wherein customer information includes a customer profile representing preferences of the customer for the good or the service desired by the customer.

5. A method according to claim 1:
   wherein the steps of accessing the reservation information, making the request and receiving the confirmation information are performed by a fixed customer communication device, and
   wherein the step of receiving the electronic navigation information is performed by a mobile customer communication device.

6. A method according to claim 1 further comprising the step of:
   communicating the confirmation information to the one of the plurality of businesses located at the business geographic location responsive to the customer arriving at the business geographic location.

7. A method according to claim 6 wherein the confirmation information is communicated to a business communication device, associated with the one of the plurality of businesses, at the business geographic location over a radio frequency communication link responsive to the customer communication device being proximate to the business communication device.

8. The method of claim 1 further comprising the step of:
   receiving second electronic navigation information, wherein the second electronic navigation information assists the customer in traveling from the business geographic location to a second business geographic location of a second good or service reserved by the customer.

9. The method of claim 1 further comprising the steps of:
   prior to traveling to the business geographic location, accessing second reservation information representing a second good or service that may be reserved by customers from a second business of the plurality of businesses;
   making a second request for a second reservation of the second good or service responsive to the step of accessing the second reservation information; and
   receiving second confirmation information, representing that the second reservation has been made for the second good or service associated with the second business, responsive to the step of making the second request.

10. The method of claim 1, wherein the electronic navigation information comprises at least one of an e-text direction and a highlighted map travel path.

11. The method of claim 1, further comprising the step of selecting a route type from a plurality of route types associated with the electronic navigation information, wherein the plurality of route types includes at least one of the quickest route and the shortest route.

12. The method of claim 1, further comprising the step of determining the customer geographic location by at least one of global positioning system locating or 911 cellular service locating.

13. The method of claim 1, wherein the reservation communication device may change an offer or counteroffer based on time of day, week, or year.

14. The method of claim 1, wherein the reservation communication device may change an offer or counteroffer based on volume of sales of the product or the service.

15. The method of claim 1, wherein the reservation communication device may change an offer or counteroffer based on a special promotion.

16. The method of claim 1, wherein the good or the service comprises a transportation event.

17. The method of claim 16, wherein the transportation event comprises at least one of an airplane, a boat, and a bus.

18. The method of claim 1, wherein the good or the service comprises an entertainment event.

19. The method of claim 18, wherein the entertainment event comprises at least one of a musical concert, a sporting event, and live theater.

20. The method of claim 1, wherein the good or the service comprises an accommodation event.

21. The method of claim 20, wherein the accommodation event comprises at least one of a restaurant and a hotel.

22. The method of claim 1, wherein the reservation communication device comprises at least one of a telephone, a radio, a pager, and a personal digital assistant.

23. The method of claim 1, wherein the reservation communication device comprises a computer.

24. The method of claim 1, wherein the reservation communication device comprises cable television.

25. A method, comprising:
accessing reservation information representing a good or a service that may be reserved by customers from one of a plurality of businesses;
making a request for a reservation of the good or the service responsive to the step of accessing the reservation information;
receiving confirmation information, representing that the reservation has been made for the good or the service associated with one of the plurality of businesses, responsive to the step of making the request;
transmitting a request for electronic navigation information responsive to the step of receiving the confirmation information, wherein the electronic navigation information comprises directions to assist a customer in traveling from a customer geographic location to a business geographic location of the good or the service reserved by the customer, wherein the customer geographic location is automatically determined for the customer by a location-determining device in response to receipt of the confirmation information;
receiving the electronic navigation information from a reservation communication device over a communication link responsive to the step of transmitting the request for the electronic navigation information; and
communicating the confirmation information to the one of the plurality of businesses located at the business geographic location of the good or the service reserved by the customer responsive to the customer arriving at the business geographic location.

26. A method according to claim 25 further comprising the steps of:
transmitting a payment to one of the reservation communication device and a business communication device for the good or the service associated with the reservation responsive to the step of making the request for the reservation; and
receiving receipt information representing that the payment has been received by the one of the reservation communication device and the business communication device responsive to the step of transmitting the payment.

27. A method according to claim 25 wherein customer information includes a customer profile representing preferences of the customer for the good or the service desired by the customer.

28. A method according to claim 25:
wherein the steps of accessing the reservation information, making the request and receiving the confirmation information are performed by a fixed customer communication device, and
wherein the step of receiving the electronic navigation information is performed by a mobile customer communication device.

29. A method according to claim 25 wherein the confirmation information is communicated to a business communication device, associated with the one of the plurality of businesses, at the business geographic location over a radio frequency communication link responsive to the customer communication device, associated with the customer, being proximate to the business communication device.

30. A customer communication device, comprising:
a first communication interface adapted to communicate customer information, including reservation information and electronic navigation information, between the customer communication device and a reservation communication device, wherein the reservation information represents a good or a service that may be reserved by customers from one of a plurality of businesses, and wherein the electronic navigation information comprises directions to assist a customer in traveling from a customer geographic location to a business geographic location of the good or the service reserved by the customer, wherein the customer geographic location is automatically determined for the customer by a location-determining device in response to receipt of the confirmation information;
a memory unit coupled to the first communication interface and adapted to store the customer information received via the first communication interface; and
a controller coupled to the first communication interface and the memory unit and adapted to perform the steps of:
accessing the reservation information via the first communication interface;
making a request for a reservation of the good or the service via the first communication interface responsive to the step of accessing the reservation information;
receiving confirmation information, representing that the reservation has been made for the good or the service associated with one of the plurality of businesses, via the first communication interface responsive to the step of negotiating; and
receiving electronic navigation information from the reservation communication device over a communication channel via the first communication interface responsive to the step of receiving the confirmation information.

31. A customer communication device according to claim 30 further comprising:
a second communication interface coupled to the controller and the memory unit and adapted to transmit the confirmation information from the customer communication device to a business communication device, associated with the one of the plurality of businesses, at the business geographic location responsive to the customer communication device being proximate to the business communication device.

32. A customer communication device according to claim 31 wherein the second communication interface further comprises:
a radio frequency communication interface adapted to transmit the confirmation information over a radio frequency communication channel responsive to the customer communication device being proximate to the business communication device.

33. A customer communication device according to claim 30 further comprising:

a location-determining device coupled to the controller and adapted to determine the customer geographic location associated with the customer communication device.

34. A customer communication device according to claim 30 wherein the first communication interface further comprises at least one of a wireline communication interface, a coaxial cable communication interface and a radio frequency communication interface.

35. A customer communication device according to claim 32 wherein the radio frequency communication interface is adapted to communicate packet data signals.

* * * * *